United States Patent [19]

Tominaga

[11] Patent Number: 4,751,257
[45] Date of Patent: Jun. 14, 1988

[54] RESIN COATING COMPOSITION

[75] Inventor: Akira Tominaga, Hiratsuka, Japan

[73] Assignee: Kansai Paint Co., Ltd., Amagasaki, Japan

[21] Appl. No.: 905,327

[22] Filed: Sep. 9, 1986

[30] Foreign Application Priority Data

Sep. 9, 1985 [JP] Japan .................. 60-197780

[51] Int. Cl.$^4$ ............................. C08G 59/14
[52] U.S. Cl. ..................... 523/414; 523/416; 525/504; 525/523; 528/111; 528/117; 528/369; 528/407; 528/418
[58] Field of Search ............. 525/504, 523; 528/111, 528/117, 407, 369, 418; 523/414, 416

[56] References Cited

U.S. PATENT DOCUMENTS

| | | | |
|---|---|---|---|
| 4,327,200 | 4/1982 | Leitner et al. | 528/111 |
| 4,376,844 | 3/1983 | Emmons et al. | 528/117 |
| 4,386,191 | 5/1983 | DiSalvo et al. | 525/504 |
| 4,431,781 | 2/1984 | Paar | 523/414 |
| 4,480,083 | 10/1984 | Tortorello et al. | 528/117 |
| 4,550,146 | 10/1985 | Paar et al. | 523/414 |

Primary Examiner—Earl Nielsen
Assistant Examiner—Frederick Krass
Attorney, Agent, or Firm—Wenderoth, Lind & Ponack

[57] ABSTRACT

A resin coating composition characterized by containing as its resin binder an epoxy resin derivative having an oxazolidine ring functional group of the formula

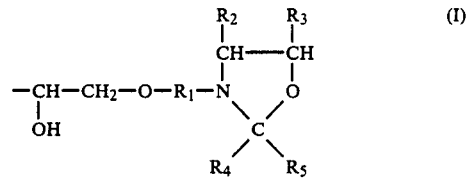

where $R_1$ is an alkylene group of 2 to 6 carbon atoms, $R_2$ and $R_3$ are each hydrogen or methyl, and $R_4$ and $R_5$ are each a residue of aldehyde or ketone.

18 Claims, No Drawings

RESIN COATING COMPOSITION

This invention relates to a novel resin coating composition. More specifically, the invention relates to a resin coating composition having an improved corrosion resistance to make it especially suitable for cationic electrocoating purposes.

In the past, polyamine resins such as the amine-added epoxy resins have been used as the resin binder in cationic electrocoating compositions. For example, there have been used as the resin binders an adduct of a polyepoxide and a primary mono- or polyamine, a secondary polyamine or a primary and a secondary polyamine (see, for example U.S. Pat. No. 3,984,299); an adduct of a polyepoxide and a secondary mono- or polyamine having a ketiminized primary amino group (see, for example U.S. Pat. No. 4,017,438); and a reaction product obtained by the etherification of a polyepoxide and a hydroxy compound having a ketiminized primary amino group (see, for example Japanese Laid-Open Patent Publication No. 43,013/1984). These polyamine resins are cured by an alcohol-blocked isocyanate compound to form an electrocoating film and they can be given a fair rating as to the corrosion resistance of their coating film. They are however still unsatisfactory in cases where a high degree of corrosion resistance is desired as in the case of recent automobile finishings. There is therefore a strong demand that these resins be improved.

Such being the case, I engaged in extensive researches with a view toward providing a resin coating composition that not only posesses a corrosion resistance far exceeding that of the resin coating compositions in which the aforesaid amine-added epoxy resins are used as the resin binder, but also exhibit satisfactory performances in electrocoating properties as well as in film properties. These researches led to the discovery that a resin coating composition capable of achieving the foregoing objects can be obtained by using as the resin binder component an epoxy resin derivative obtained by the introduction of an oxazolidine ring functional group into the epoxy group of an epoxy resin.

There is thus provided in accordance with this invention a resin coating composition that is characterized by containing as its resin binder an epoxy resin derivative having an oxazolidine ring functional group of an the formula

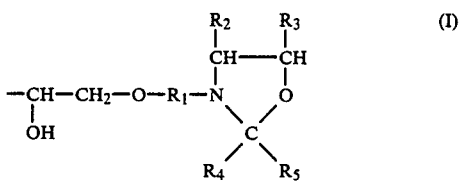

(I)

wherein $R_1$ is an alkylene group of 2 to 6 carbon atoms, $R_2$ and $R_3$ are each hydrogen or methyl, and $R_4$ and $R_5$ are each a residue of aldehyde or ketone.

The epoxy resin derivatives having an oxazolidine ring functional group which is used in the resin binder of this invention which have been heretofore obtained by various methods. There can be mentioned, by way of example, the following methods.

(1) A method of reacting a secondary amine group of an oxazolidine obtained from mono-beta-hydroxyalkyl amine and an aldehyde with a 1,2-epoxy group of an epoxy resin (see U.S. Pat. No. 4,480,083).

(2) A method comprising reacting the hydroxyl group of N-hydroxyalkyloxazolidine with a dicarboxylic acid anhydride to give a half ester, and thereafter reacting the carboxyl group of the half ester with the 1,2-epoxy group of an epoxy resin (see Japanese Laid-Open Patent Publication No. 45,222/1983).

In the case of the former method (1), there is however a general tendency to form Schiff bases during the step of obtaining the oxazolidines from monobeta-hydroxyalkylamine and aldehydes or ketones, therefore and the oxazolidines are not obtained in a high yield. There is also a defect in that the dispersibility in water of the reaction product is poor. On the other hand, in the case of the latter method (2) its process is complicated. There is also a shortcoming in that, on account of the poor resistance to hydrolysis of the half ester, the bath stability suffers when it is dispersed in water.

In this invention, the oxazolidine ring functional group-containing epoxy resin derivative can be obtained advantageously by introducing the oxazolidine group into an epoxy resin through the intermediary of the ether bond by a procedure different from the foregoing methods. To wit, this epoxy resin derivative can be obtained in the following manner. An N-hydroxyalkyloxazolidine that can be easily obtained by reacting a dialkanolamine and an aldehyde or a ketone is directly reacted with the 1,2-epoxy group contained in an epoxy resin to introduce the oxazolidine group into the epoxy resin thereby giving the desired epoxy resin derivative. When this is protonized to a neutralization rate of about 50% with an acid, it can be converted into a coating composition excelling in water dispersibility and corrosion resistance.

The N-hydroxyalkyloxazolidine (iii) used in the preparation of the aforesaid epoxy resin derivative can be obtained by reacting a dialkanolamine (i) with an aldehyde or a ketone (ii) as shown in the following equation.

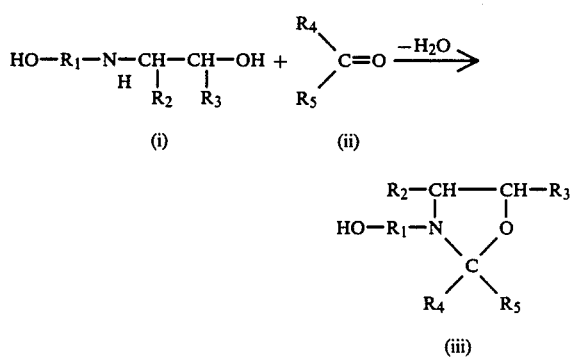

wherein $R_1$ is an alkylene group of 2 to 6 carbon atoms, $R_2$ and $R_3$ are each hydrogen or methyl, and $R_4$ and $R_5$ are each an aldehyde or ketone residue, for example, hydrogen or a ketone residue, for example, hydrogen or lower alkyl and aralkyl groups or taken together form a lower alkylene group.

The term "lower" as used herein, means that the number of carbon atoms of the group or compound in which this term is used is no more than 6, preferably 1 to 4.

As the dialkanolamine (i) to be used in the above reaction, there can be named the di-lower alkanolamines such as diethanolamine, diisopropanolamine, N-hydroxyethylaminopropanol and N-hydroxyethylaminobutanol. In view of its low cost and high activity, diethanolamine ($R_1$=—$CH_2CH_2$—, $R_2$=$R_3$=H) is most preferred.

On the other hand, as the aldehyde or ketone (ii), included are, for example, formaldehyde, acetaldehyde, benzaldehyde, acetone, methyl ethyl ketone, methyl isobutyl ketone and cyclohexanone. Of these, formaldehyde ($R_4$=$R_5$=H) is most preferred in view of its reaction yield and the stability of the product.

The reaction of the dialkanolamine (i) and the aldehyde or ketone (ii) can usually be carried out by using the aldehyde or ketone (ii) in a stoichiometrically equivalent amount or more (somewhat excess) to the dialkanolamine (i) and heating the reactants at 60° to 200° C., preferably 80° to 140° C., while removing the water formed. When a ketone of low reactivity is used, a catalyst such as formic acid or acetic acid is preferably added.

Next, the resulting N-hydroxyalkyloxazolidine (iii) is reacted with the 1,2-epoxy group of an epoxy resin to give the oxazolidine ring functional group-containing resin derivative, which is the resin binder of this invention. This reaction, when shown by its equation, proceeds in the following manner.

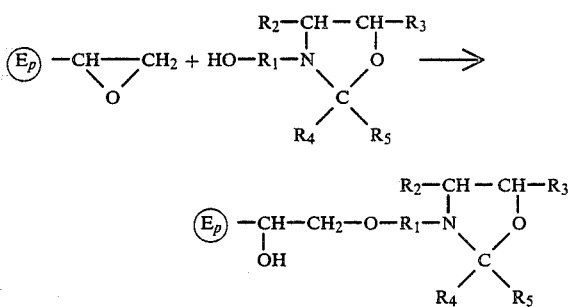

In the above equation $E_p$ represents the skeleton portion of an epoxy resin. While in the above equation only one epoxy group has been shown for sake of simplicity, it is to be understood that there is bonded, in addition, at least one other epoxy group. $R_1$, $R_2$, $R_3$, $R_4$ and $R_5$ have the same significance as hereinbefore defined.

Of the oxazolidine ring functional group of formula (I) that is introduced into the epoxy resin base in this manner, especially preferred is one having the formula

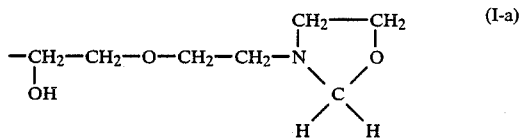

Suitably used as the epoxy resin in the foregoing reaction is the polyepoxide compounds having at least about two 1,2-epoxy groups

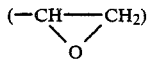

in each of their molecules as well as having a number average molecular weight of at least 200, preferably from 400 to 4000, and more preferably from 800 to 2000. The known polyepoxide compounds can be used as such a polyepoxide compound. For example, included are the polyglycidyl ethers of polyphenols that can be produced by reacting a polyphenol with epichlorohydrin in the presence of an alkali. As typical examples of such polyepoxide compounds included are the glycidyl ethers of polyphenols such as bis(4-hydroxyphenyl)-2,2-propane, bis(4-hydroxyphenyl)-1,1-ethane, bis(4-hydroxyphenyl)-methane, 4,4'-dihydroxydiphenyl ether, 4,4'-dihydroxydiphenylsulfone, phenol novolak and cresol novolak, and polymers thereof.

Of the above polyepoxide compounds, especially suitable from the standpoint of cost and corrosion resistance are the polyglycidyl ethers of polyphenols having a number average molecular weight of at least about 380, preferably about 800 to 2000, and an epoxy equivalency ranging from 190 to 2000, preferably 400 to 1000. Especially preferred is the polyepoxide compound having the following general formula

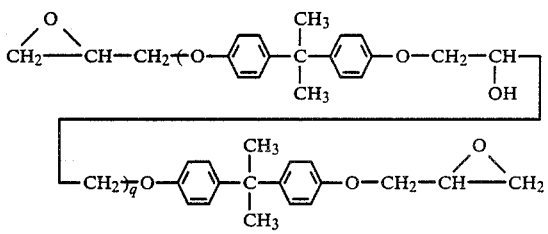

wherein q is from 0 to 4.

On the other hand, when importance is attached to performances other than corrosion resistance, there can also be used aside from the above-mentioned polyepoxide compounds, the alicyclic polyglycicyl ethers such as bis(4-hydroxycyclohexyl)-2,2-propane and bis(4-hydroxycyclohexyl)-methane; polyglycidyl esters of polycarboxylic acids such as terephthalic acid and tetrahydrophthalic acid; epoxidized 1,2-polybutadiene; and the glycidyl (meth)acrylate copolymers.

While the reaction between the epoxy resin and the N-hydroxyalkyloxazolidine proceeds by just heating the reactants at usually 80° to 140° C., it preferably is carried out between 100 and 120° C., in the absence or presence of a solvent selected from alcohols, ketones or ethers. Again, the equivalency ratio of the 1,2-epoxy groups of the epoxy resin to the N-hydroxyalkyloxazolidine is not necessarily critical, but for avoiding gelling by the remaining epoxy groups, the equivalency ratio of 1,2-epoxy groups to the N-hydroxyalkyloxazolidine should usually be in the range of 1.5/1–1/1, preferably 1.2/1–1/1. When this ratio is exceeded, it is desired that a part of the 1,2-epoxy groups be reacted in advance with a reactant such as an amine, a phenol or a carboxylic acid.

The amount of the oxazolidine group to be introduced is usually 0.2 to 2.4 groups, and especially preferably 0.4 to 1.2 groups, per 1000 gram of the ratio solids. If this amount is less than 0.2 groups, the water dispersibility of the resin is insufficient, whereas if it exceeds 2.4 groups, there is a drawback that the amount of acid required for solubilizing the resin becomes too great. Further, the resulting epoxy resin derivative may have an amine value of usually 1 to 140, preferably 20 to 70.

The term "amine value", as used herein, is the amount of KOH equivalent to HCl required for neutralizing one gram of the resin, and is shown in milligrams per gram of resin.

When the remaining unreacted 1,2-epoxy groups of the resulting epoxy resin derivative are modified by reacting them with say a hydroxyl, carboxyl or amino group-terminated polyester, polyether, polyurethane, polyamide or polybutadiene, the coating film properties can be improved. Examples of such modifiers are polycaprolactone diol, polypropylene glycol, polytetramethylene glycol, dimeric acid polyamide and carboxyl-terminated acrylonitrile/butadiene copolymer. The reaction of these modifiers and the epoxy resin derivative can be carried out prior to the reaction of the epoxy group with the N-hydroxyalkyloxazolidine or at the same time. At times, it may also be performed after the reaction of the epoxy group and the N-hydroxyalkyloxazolidine. In such cases where epoxy groups that can be used for the modification are not left in the molecule, a hydroxyl-terminated polymer may be reacted with a diisocyanate to convert the terminal group to an isocyanate group and then reacted with the hydroxyl group of the epoxy resin.

The modifier used in modifying the epoxy resin is used in such an amount so as not to impair the properties of the epoxy resin itself. In general, a weight ratio of the modifier to the epoxy resin of not more than 1/1 is used, preferably not more than 1/2.

Next, for imparting heat-curability to the oxazolidine group-containing epoxy resin derivative, a crosslinking functional group must be introduced into the epoxy resin derivative, or an external curing agent must be conjointly used. As crosslinking functional groups to be introduced, there can be included the known blocked isocyanate groups, beta-hydroxy ester groups, alpha,-beta-unsaturated carbonyl groups and N-methylol groups. However, especially convenient in view of their low temperature curability are the active carbamic acid ester groups of the formula

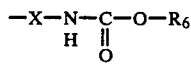

wherein X is a tertiary nitrogen atom, an oxygen atom or a sulfur atom, or an aliphatic hydrocarbon group of 1 to 6 carbon atoms having the above atoms at the end thereof and $R_6$ is a hydroxyl- or an alkoxyl-containing aliphatic hydrocarbon group of 1 to 12 carbon atoms, which may contain an ether linkage.

Examples of the carbamic acid esters are as follows:

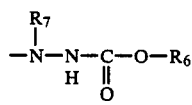 (a)

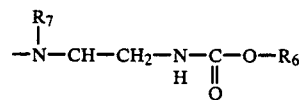 (b)

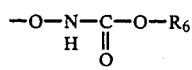 (c)

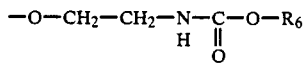 (d)

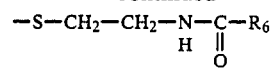 (e)

In the above formulae, $R_6$ is as defined above, and $R_7$ is either a methyl, ethyl, hydroxyethyl, aminoethyl or an alkylcarbamate ethyl group.

If corrosion resistance is a main consideration, the group (a) obtained from a hydrazine and an alkylene carbonate is most preferred.

The active carbamic acid ester functional group described hereinabove is known per se. It has been fully disclosed in, for example, U.S. Pat. No. 4,528,363. Hence, reference is made to the aforesaid patent for a more complete description of said active carbamic acid ester functional group.

On the other hand, there may be used as an external curing agent, those compounds having at least two of the aforesaid crosslinking groups in each of their molecules. Examples of such compounds are blocked polyisocyanates, beta-hydroxyethyl esters of polycarboxylic acids, malonic ester, methylolated melamine and methylolated urea. Most preferred are however curing agents having the above-described active carbamic acid ester group, for example, curing agents obtained by reacting 1 mole of diglycidyl ether of bisphenol A with an adduct of 2 moles of diethylene triamine and 4 moles of ethylene carbonate.

For imparting water dispersibility to the oxazolidine group-containing epoxy resin derivative, this may be achieved by protonizing the oxazolidine group with a water-soluble organic carboxylic acid such as formic acid, acetic acid or lactic acid. The protonization is carried out to a rate of about 40 to about 70%, preferably about 50 to about 60%. The oxazolidine group is hydrolyzed to some degree in the aqueous dispersion and regenerates the beta-hydroxyalkyl secondary amine group, but this does not cause any impairment of the water dispersion stability, the heat curability and the corrosion resistance.

This aqueous dispersion is especially suitable for use in cationic electrocoating. In this case, it is used after adding, as required, such components as pigments, solvents, curing catalysts, surfactants, and the like.

In carrying out the electrocoating of articles with this aqueous dispersion, the known methods and apparatuses that have been used heretofore in cationic electrocoating can be used without modification. In carrying out the electrocoating operation, the article to be coated is used as the cathode, and as the anode a stainless steel or carbon plate is preferably used. While there are imposed no particular restrictions as to the conditions in carrying out the electrocoating operation, generally speaking the electrocoating is desirably carried out under agitation at a bath temperature of 20° to 30° C.; a voltage of 100 to 400 V, preferably 200 to 300 volts; a current density of 0.01 to 3 A/dm$^2$; an electricity passage time of 1 to 5 minutes; an electrode area ratio (A/C) of 2/1 to 1/2; and an electrode distance of 10 to 100 cm.

The coating film that has been deposited on an article, the cathode, can, after washing, be cured by baking it at about 150° to about 180° C.

The composition of this invention, in addition to its use as the above-described cationic electrocoating resin binder, can also be dissolved and diluted with an ordinary solvent and be used as a solvent type paint binder.

The following examples will serve to illustrate the present invention more fully.

EXAMPLE 1

A mixture of 105 parts (1 mole) of diethanolamine, 30 parts (1 mole) of paraformaldehyde and 90 parts of toluene was heated under reflux at 130° to 150° C., and the reaction was continued until 18 parts (1 mole) of distilled water was obtained. This was followed by removing the solvent under reduced pressure to give N-hydroxyethyloxazolidine having an amine value of 479.

Next, 380 parts (1 mole) of bisphenol A-diglycidyl ether (epoxy equivalency 190), 110 parts (0.2 mole) of polycaprolactone diol (hydroxyl equivalence 275) and 23.4 parts (0.2 mole) of the above N-hydroxyethyloxazolidine were mixed with heating. The reaction was continued at 140° C. until the epoxy value declined to 2.7, after which the reaction mixture was diluted with 209 parts of ethylene glycol monobutyl ether followed by the addition of 136.8 parts (0.6 mole) of bisphenol A and 46.8 parts (0.4 mole) of N-hydroxyethyloxazolidine. The reaction was then carried out at 120° C. until the epoxy value became substantially 0 to give an oxazolidine group-containing epoxy resin derivative, i.e., the resin binder of this invention, having an amine value of 48.

Thirty parts of diphenylmethane diisocyanate blocked with ethylene glycol mono 2-ethylhexyl ether and 1 part of dibutyltin dilaurate were mixed with 91 parts of the thus obtained resin binder, after which the mixture was protonized by adding 1.9 parts of acetic acid (amount neutralized 53% of theory). This mixture was used, and the cationic electrocoating of an untreated steel panel was performed followed by its baking at 170° C. for 20 minutes to give a smooth solvent resistance coating film having a thickness of about 30 microns. The resistance to salt spraying of this coated plate was satisfactory, it having passed the 720-hours test (in accordance with JIS K5400-7.8).

COMPARATIVE EXAMPLE 1

380 parts (1 mole) of bisphenol A-diglycidyl ether (epoxy equivalency 190), 110 parts (0.2 mole) of polycaprolactone diol (hydroxy equivalence 275) and 0.7 part of dimethylbenzylamine were mixed with heating. The reaction was continued at 140° C. until the epoxy value dropped to 2.7, after which the reaction mixture was diluted with 207 parts of ethylene glycol monobutyl ether, and 136.8 parts of bisphenol A and 63 parts (0.6 mole) of diethanolamine were added. After the evolution of heat subsided at 80° to 90° C., the reaction was carried out at 120° C. until the epoxy value became substantially 0 to give an amine-added epoxy resin derivative having an amine value of 49.

When an attempt was made to prepare an electrocoating bath as in Example 1, 2.5 parts of acetic acid (amount of neutralization 70% of theory) was required. Further, the coating film (thickness about 30 microns) of the untreated steel panel obtained was only able to pass the 480-hours test in the salt spray resistance test. It thus was much poorer than in the case of the coating film obtained in Example 1.

EXAMPLE 2

105 Parts (1 mole) of diethanolamine, 103 parts (1.05 mole) of cyclohexanone and 41.6 parts of toluene were heated at 150° to 180° C. under reflux, and the reaction was carried out until 18 parts (1 mole) of distilled water was obtained. The solvent was then removed under reduced pressure to give an N-hydroxyethyl-substituted oxazolidine having an amine value of 303.

Next, 76 parts (1 mole) of hydroxyethylhydrazine and 51.5 parts (0.5 mole) of diethylene triamine were dissolved in 91 parts of ethylene glycol monobutyl ether, and to the resulting solution was added 176 parts of ethylene carbonate in small increments at 40° C. and reacted at this temperature until the decline in the amine value stopped. There was thus obtained an ethylene carbonate adduct.

After dissolving 980 parts (1 mole) of a bisphenol A-diglycidyl ether-type epoxy resin (epoxy equivalency 495) in 322 parts of ethylene glycol monobutyl ether, 394.5 parts of the above ethylene carbonate adduct was added. The reaction was then carried out at 110° C. until the epoxy value dropped to 0.39 (calculated as solids) followed by the addition of 92.5 parts (0.5 mole) of the aforesaid N-hydroxyethyloxazolidine and carrying out the reaction at 110° C. until the water-soluble amine value became substantially 0. Lead 2-ethylhexanoate (13.8 parts) was then added, and an ester interchange reaction was carried out until the Gardner viscosity (ethylene glycol monobutyl ether 50% solution) reached V to W to give the epoxy resin derivative, the resin binder in this invention, having an amine value of 40.

Two parts of acetic acid was added to 131 parts of the resin binder obtained above to carry out its protonization (neutralization 48%), after which it was dispersed in water to prepare an electrocoating bath of 15% solids content. The cationic electrocoating of a steel panel was then performed followed by baking the coating film at 160° C. for 20 minutes. The thickness of the film was about 20 microns. When this coated panel was submitted to a salt water spray test, it withstood more than 960 hours of the salt water spray, thus demonstrating its superior resistance.

COMPARATIVE EXAMPLE 2

Sixty-one parts (1 mole) of monoethanolamine, 103 parts (1.05 moles) of cyclohexanone and 32.8 parts of toluene were heated under reflux and reacted until 18 parts (1 mole) of distilled water was obtained. This was followed by distilling off the solvent under reduced pressure to give a substituted oxazolidine.

The thus obtained substituted oxazolidine (70.5 parts, 0.5 mole) was used instead of the N-hydroxyethyloxazolidine of Example 2, and the reaction was carried out in the same manner to give an oxazolidine group-containing epoxy resin derivative having an amine value of 42.

When an attempt was made to prepare an electrocoakting bath as in Example 2, 2.7 parts of acetic acid (neutralization 60%) was required. In this case, the coating film (thickness about 20 microns) obtained on coating an untreated steel panel passed the 720-hour mark in the salt water spray resistance test.

What is claimed is:

1. A resin coating composition characterized by containing as its resin binder an epoxy resin derivative having an active carbamic acid ester functional group and an oxazolidine ring functional group of the formula

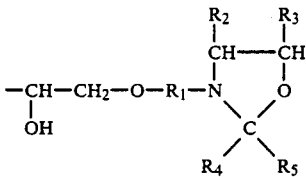

wherein $R_1$ is an alkylene group of 2 to 6 carbon atoms, $R_2$ and $R_3$ are each hydrogen or methyl, and $R_4$ and $R_5$ are each a residue of aldehyde or ketone.

2. A resin coating composition of claim 1 wherein the group shown by formula (I) is an oxazolidine ring functional group obtained by reacting the 1,2-epoxy group of an epoxy resin with an N-hydroxyalkyloxazolidine of the formula

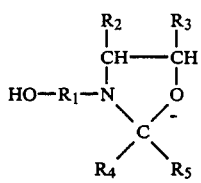

wherein $R_1$, $R_2$, $R_3$, $R_4$ and $R_5$ are as defined in claim 1.

3. A resin coating composition of claim 1 wherein $R_1$ is the group —$CH_2CH_2$—.

4. A resin coating composition of claim 1 wherein $R_2$ and $R_3$ are each hydrogen.

5. A resin coating composition of claim 1 wherein $R_4$ and $R_5$ are each hydrogen, lower alkyl or aralkyl group, or taken together represent a lower alkylene group.

6. A resin coating composition of claim 1 wherein $R_4$ and $R_5$ are each hydrogen.

7. A resin coating composition of claim 1 wherein the oxazolidine ring functional group has the formula

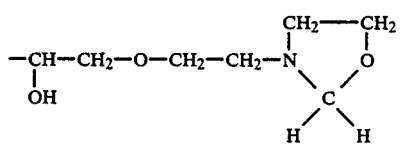

8. A resin coating composition of claim 2 wherein said epoxy resin is a polyepoxide compound having at leaat about two 1,2-epoxy groups in each of its molecules and moreover has a number average molecular weight of at least 200.

9. A resin coating composition of claim 8 wherein said polyepoxide compound is a polyglycidyl ether of a polyphenol having a number average molecular weight of at least about 380 and an epoxy equivalency ranging from 190 to 2000.

10. A resin coating composition of claim 9 wherein said polyepoxide compound is a glycidyl ether of a polyphenol selected from the group consisting of bis(4-hydroxyphenyl)-2,2-propane, bis(4-hydroxyphenyl)-1,1-ethane, bis(4-hydroxyphenyl)-methane, 4,4'-dihydroxydiphenyl ether, 4,4'-dihydroxydiphenylsulfone, phenol novolak and cresol novolak.

11. A resin coating composition of claim 9 wherein said polyepoxide compound has the formula

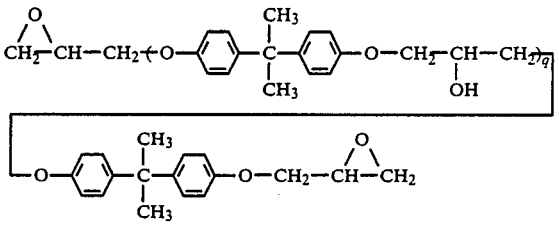

wherein q is a number from 0 to 4.

12. A resin coating composition of claim 1 wherein said epoxy resin derivative has 0.2 to 2.4 oxazolidine ring functional groups per 1000 grams of said resin derivative.

13. A resin coating composition of claim 1 wherein said active carbamic acid ester functional group has the formula

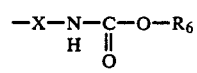

wherein X is a tertiary nitrogen atom, oxygen atom or sulfur atom, or an aliphatic hydrocarbon group of 1 to 6 carbon atoms having the above atoms at the end thereof; and $R_6$ is hydroxyl or an aliphatic hydrocarbon group of 1 to 12 carbon atoms, which may contain an ether linkage.

14. A resin coating composition of claim 13 wherein said active carbamic acid ester functional group has the formula

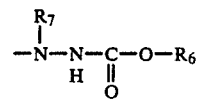

wherein $R_7$ is methyl, ethyl, hydroxyethyl, aminoethyl or alkyl carbamate ethyl group; and $R_6$ is as defined in claim 14.

15. A resin coating composition of claim 1 further containing an external curing agent.

16. A resin coating composition of claim 1 wherein said oxazolidine ring functional group has been protonized with a water-soluble organic carboxylic acid.

17. A cationic electrocoating bath formed of the resin coating composition of claim 1.

18. An article coated with the resin coating composition of claim 1.

* * * * *